United States Patent [19]

Houtchens

[11] Patent Number: 4,563,198
[45] Date of Patent: Jan. 7, 1986

[54] METHOD AND APPARATUS FOR FLUID SEPARATION

[75] Inventor: Bruce A. Houtchens, Houston, Tex.

[73] Assignee: Board of Regents, The University of Texas System, Austin, Tex.

[21] Appl. No.: 677,794

[22] Filed: Dec. 4, 1984

[51] Int. Cl.$^4$ ............................................. B01D 19/00
[52] U.S. Cl. .......................................... 55/41; 55/55; 55/192; 55/203; 210/782; 210/927; 210/512.3
[58] Field of Search ................. 55/190, 192, 193, 198, 55/199, 203, 41, 36, 55; 210/512.3, 927, 782

[56] References Cited

U.S. PATENT DOCUMENTS

| | | | |
|---|---|---|---|
| 4,289,610 | 9/1981 | Erickson | 55/203 |
| 4,340,340 | 7/1982 | Brown et al. | 55/190 |
| 4,368,118 | 1/1983 | Siposs | 210/927 |
| 4,447,220 | 5/1984 | Eberle | 210/927 |

*Primary Examiner*—John Adee
*Attorney, Agent, or Firm*—Arnold, White & Durkee

[57] ABSTRACT

A compact, fast-reacting, centrifugal fluid separator which serves to separate a fluid into gaseous and liquid components without the aid of gravity. The fluid separator is primarily designed for use as a biological fluid suction and separation device, the separator being particularly useful in space-based applications where a microgravity environment exists. Broadly speaking, the separator includes a cylindrical chamber, an elongated shaft rotatably mounted in the chamber, and a propeller and flat disc coupled to the shaft adjacent each other. A source of negative pressure is connected to the chamber adjacent one end of the shaft and the biological fluid is passed into the chamber adjacent the other end of the shaft so as to impinge upon the propeller. The propeller directs a portion of the fluid onto the rotating disc; the centrifugal action of the propeller and disc biases the heavier liquid component of the fluid radially outward while the lighter gaseous component remains close to the shaft and is extracted by the suction source. While the fluid separator is ideal for use in space-based applications, it is also a viable alternative to conventional fluid separators, particularly where compactness and short response time are desirable.

31 Claims, 7 Drawing Figures

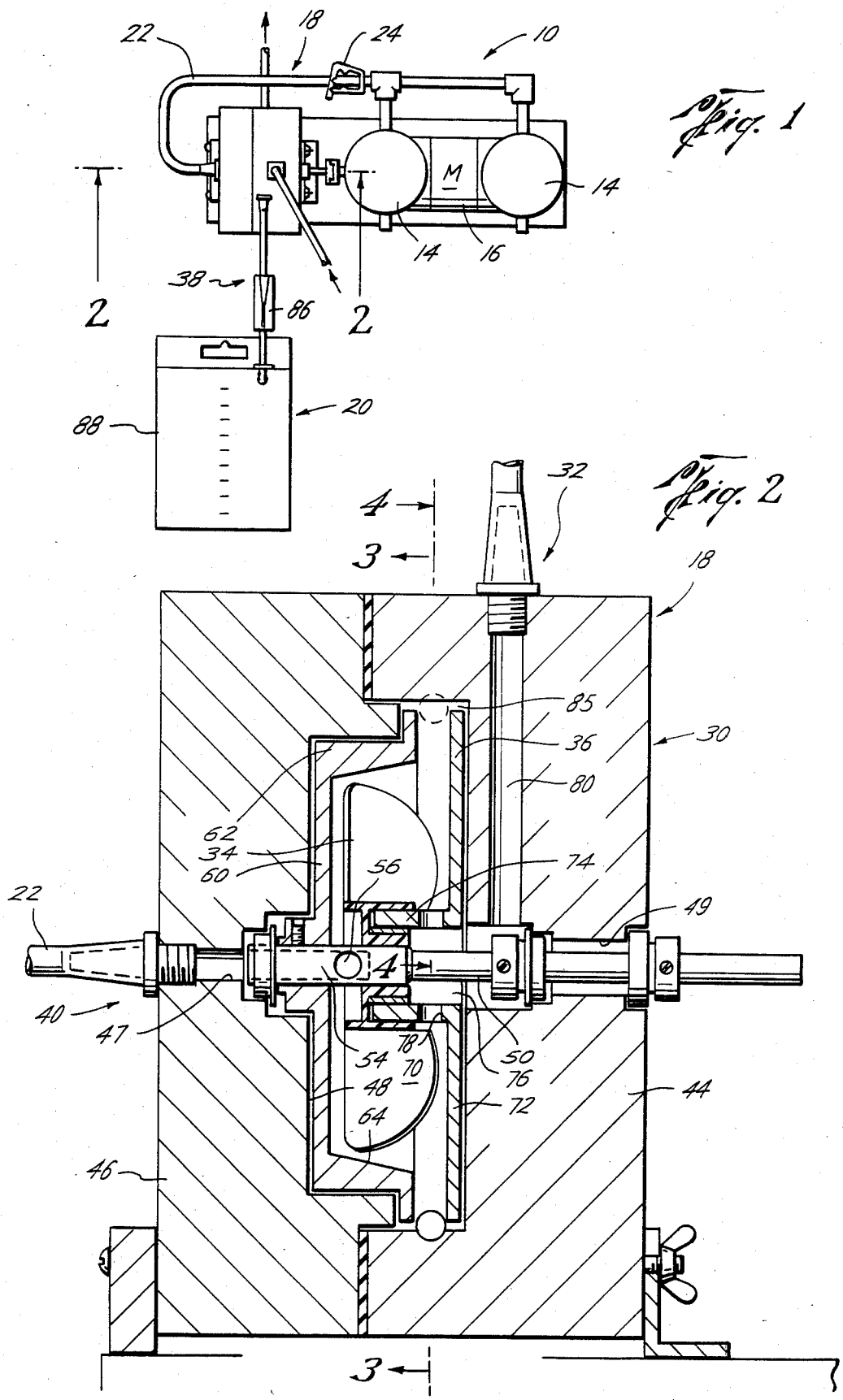

METHOD AND APPARATUS FOR FLUID SEPARATION

BACKGROUND OF THE INVENTION

1. Field of the Invention

This invention relates to a fluid separation device particularly adapted for separating a biological fluid into a liquid and gaseous component without the aid of gravity. More particularly, the device hereof relates to a suction and separation device useful for removing biological fluids during surgical operations in a microgravity environment, such as encountered in outerspace, and for separating the biological liquid component from the entrained air.

2. Description of the Prior Art

Conventional surgical suction and separation units are relatively simple devices designed to extract biological matter, such as blood, away from the area of the surgical operation. Such conventional units typically employ a source of suction, such as a diaphragm-type pump, and a suction tube leading to the surgical cavity. In use, biological matter is removed from the surgical cavity entrained in ambient air. It is advantageous to remove the biological matter from the entraining air medium or damage to the pump may occur. Conventional units include a "drop" chamber connected in series in the suction line between the surgical cavity and the pump. As the biological fluid suspended in the ambient air enters the drop chamber, the liquid and solid components of the biological matter gravitate in the drop chamber with the air and gaseous components being extracted through the pump.

While such drop chamber type suction and separation units are functional in many applications, a number of problems remain. First, such drop chambers are typically several liters in size. If the drop chamber capacity is too small, suction must be discontinued during the surgical process to replace the full drop chamber with an empty one. On the other hand, a drop chamber having several liters of capacity often gives an undesirable slow response time for producing suction during the surgical operation. For example, during the surgical operation, suction is applied intermittently between biological matter, air, and a combination of the two. When the transition is made between conveying air to conveying biological matter, a short response time is present before biological matter is picked up. While such response time is typically of a modest duration, quick response time can be critical in a surgical operation.

Another problem with such conventional drop chamber type suction and separation units is the limitation in capacity of such units. It should be apparent from the above discussion that if the drop chamber has too large of a capacity, the response time for producing suction can become too long to be practical. However, in many cases, drop chamber capacity is insufficient and a pause in operation can result from the necessity to change or empty the drop chamber. Thus, a surgeon faces the choice between a large capacity drop chamber with a long response time and a small capacity drop chamber which must be periodically emptied.

A particular problem addressed by Applicant was the dependence of conventional surgical suction and separation devices upon gravity to achieve the separation of the liquid and solid components of the biological fluid from the gaseous component. With the advent of space-based industrial and research operations, it has become apparent that a broader spectrum of medical problems will affect the space-based personnel. Such space-based operations will necessitate in the future at least some capacity to perform emergency surgery. However, because conventional suction and separation devices are dependent upon gravity, it was necessary to develop alternative methods of removing biological matter during surgery in a microgravity space environment.

One unattractive alternative would be to simply let the biological matter "float" away from the surgical cavity during the operation. Another proposal has been to simply evacuate the biological matter entrained in the cabin air and expel the suspension into outer space. However, a difficulty arises in that the cabin air is unnecessarily evacuated, producing a need to replenish the cabin environment. Still another proposal has been to simply filter the biological matter from the air. However, biological matter quickly clogs filters, rendering this proposal ineffective.

Another approach at solving the problem of providing suction during surgical operations in a microgravity environment is exemplified by U.S. Pat. No. 4,367,728. This disclosure concerns a flexible, transparent envelope which is draped over the patient and includes glove inserts through which the surgeon can perform the operation on the patient. Such an envelope, instead of providing the suction needed during a surgical operation, simply confines the problem to an area surrounding the patient. Of course, the physician's area of operation is limited because of the necessity to use the glove inserts. Also, in more complex operations, the envelope can become sufficiently filled with biological matter to prevent efficient surgery.

Examples of other attempts at handling fluids in a microgravity environment include U.S. Pat. No. 3,828,524 and U.S. Pat. No. 3,988,933.

SUMMARY OF THE INVENTION

The problems outlined above are in large major solved by the separator unit in accordance with the present invention. That is, the separator unit hereof includes a compact, fast-reacting separation device which effectively separates the liquid and solid matter from the gaseous component without the aid of gravity. As such, the separation device hereof is particularly useful in a microgravity environment, such as when performing surgery in outerspace. Further, the device hereof is useful in terrestrial applications whenever compact size, quick response time, or large capacity are desired. Although the separation device hereof is particularly designed to handle a biological fluid, it is understood that the device is useful with practically any type of fluid. As used herein, the term "fluid" means a flowable substance, such as a mixture comprising gas, liquid, and potentially some amount of solid matter.

Broadly speaking, the separator unit of the present invention includes a suction source, a liquid collection mechanism and a separation device. The separation device hereof comprises a housing, a chamber within the housing and mechanism for introducing the fluid into the chamber. A propeller is rotatably mounted in the chamber such that the fluid is introduced into the chamber to contact the propeller. A disc is rotatably mounted in the chamber and is disposed for receiving a portion of the fluid from the propeller. The propeller and disc cooperate to outwardly bias the liquid component of the fluid and the device includes an outlet for passing the liquid component out of the chamber. An exhaust mechanism is provided for allowing passage of the gaseous component out of the chamber.

Preferably, the separation device presents a cylindrically-shaped chamber having a central axis with the propeller and disc rotatably mounted coaxially in the chamber. Structure is presented for applying suction to one end of the chamber adjacent the axis, and for introducing fluid into the chamber adjacent the other end of the axis. The fluid is introduced into the chamber to impinge upon the propeller, with the rotating propeller operating to direct a portion of the impinging fluid radially outward and in the direction of the disc. The spinning disc is operable to outwardly bias the greater mass density liquid component of the fluid, while the lesser mass density gaseous component of the fluid is conveyed from a region adjacent the chamber axis by the suction. An outlet mechanism is located adjacent the periphery of the chamber, and preferably presents a plurality of bores each having a one way check valve for passing the liquid component out of the chamber.

In particularly preferred forms, a collapsible bag is connected to each outlet bore to receive the radially-outwardly biased liquid. Advantageously, when one bag becomes full, the full bag can be disposed of by stopping flow for that particular outlet bore while the other bags continue filling. Thus, there is no limit on fluid capacity of the separator hereof, and it is not necessary to discontinue suction and separation while disposing of a full bag. In an alternative embodiment, a collapsible bag is contained in a sealable container and a source of suction applied to the container to reduce external pressure on the collapsible bag and thereby accelerate the rate of filling.

BRIEF DESCRIPTION OF THE DRAWINGS

FIG. 1 is a top plan view of the suction separator unit of the present invention;

FIG. 2 is a fragmentary, vertical sectional view of the device hereof taken along line 2—2 of FIG. 1;

DESCRIPTION OF THE PREFERRED EMBODIMENTS

Figure 3:
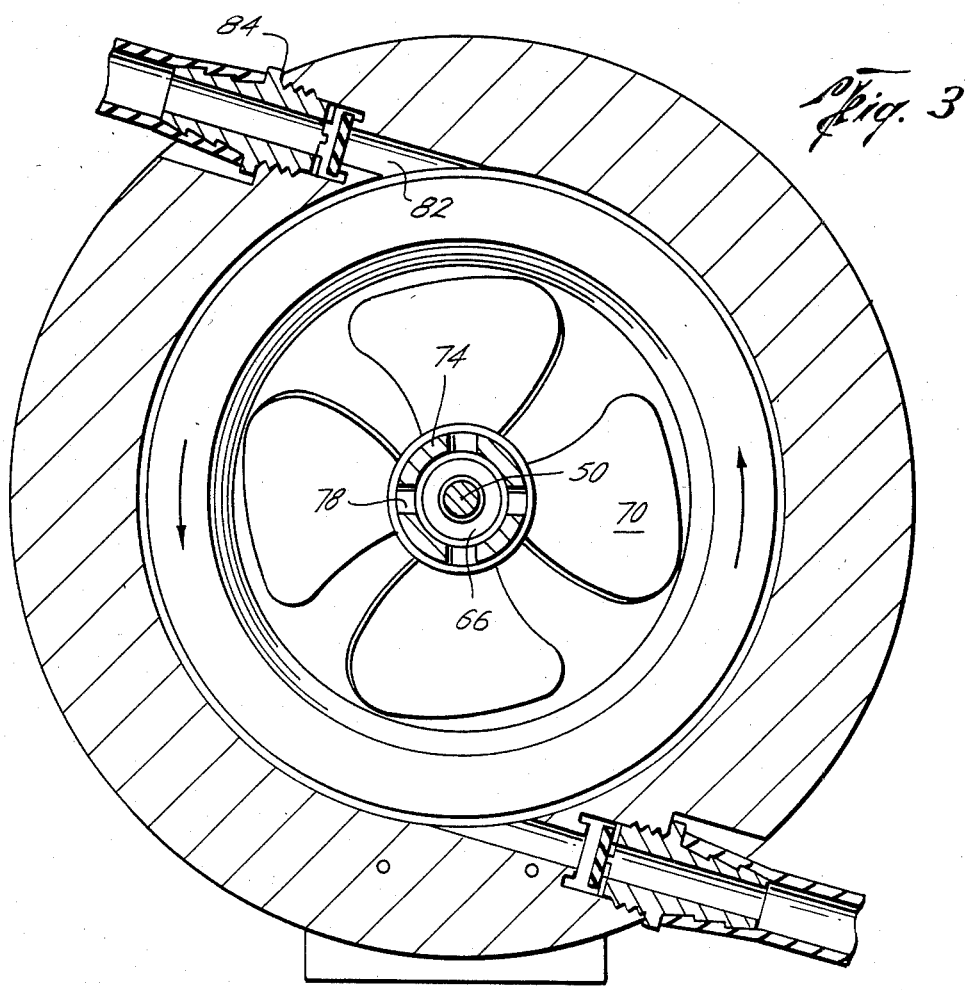
FIG. 3 is a fragmentary sectional view taken along line 3—3 of FIG. 2.
Figure 4:
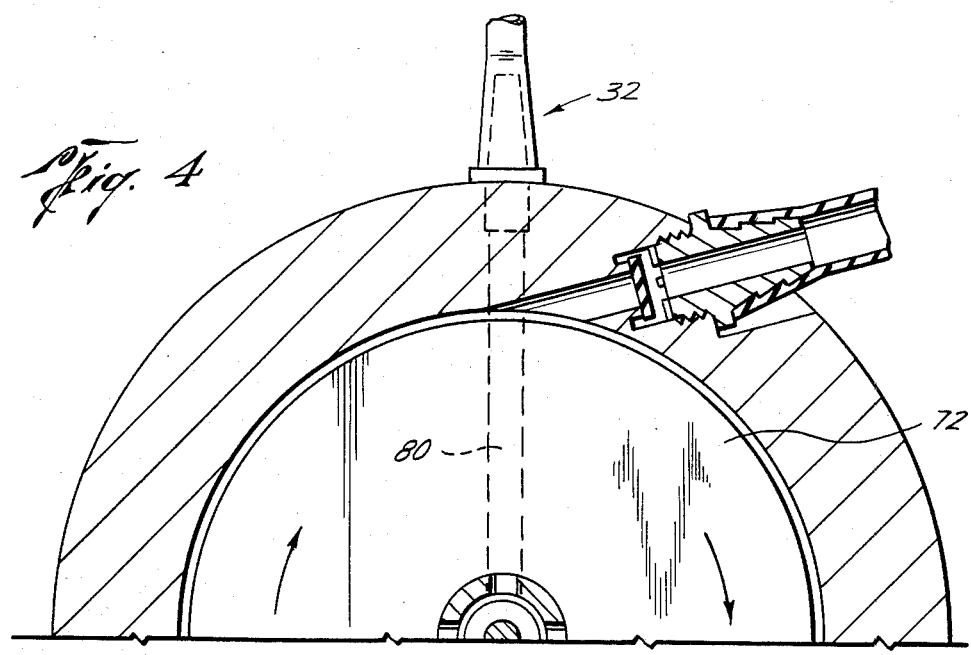
FIG. 4 is a fragmentary, sectional view taken along line 4—4 of FIG. 2.

Turning now to the drawings, a suction separator unit 10 in accordance with the present invention is illustrated. Broadly speaking, the unit 10 includes suction means 12 having a pump 14 and a motor 16, a fluid separation device 18 operatively driven by the motor 16, and collections 20 for receiving the separated liquid from the device 18 (see FIG. 1). As can be appreciated, many types of pump and motor arrangements are commercially available, with the preferred embodiment of FIG. 1 illustrating a pair of diaphragm-type pumps 14 driven by a constant speed motor 16, with a suction line 22 operatively connecting pumps 14 in series with the separation device 18. Further, a device 24 for modulating negative pressure is interposed in the suction line 22 between the chamber and pump.

Referring now to FIGS. 1–5, the separation device 18 is illustrated in more detail. Generally speaking, the separation device 18 includes: a bifurcated housing 30; a fluid introduction mechanism 32 leading from a source of biological fluid to the housing 30; a propeller mechanism 34 and a disc mechanism 36 rotatably mounted in the housing 30; outlet mechanism 38 for conveying separated liquid from the device 18 to the collection means 20; and exhaust structure 40 for collecting separated gaseous component. As shown in FIG. 2, the housing 30 comprises two halves 44, 46, each having an annular hollow therein. The halves 44, 46 are sealingly joined such that the respective hollows cooperatively define a cylindrically shaped chamber 48. Elongated tubular openings 47, 49 extend respectively through each halve 44, 46, such that with the halves joined, the openings 47, 49 extend through the housing 30 along the central axis of the chamber 48.

Figure 5:
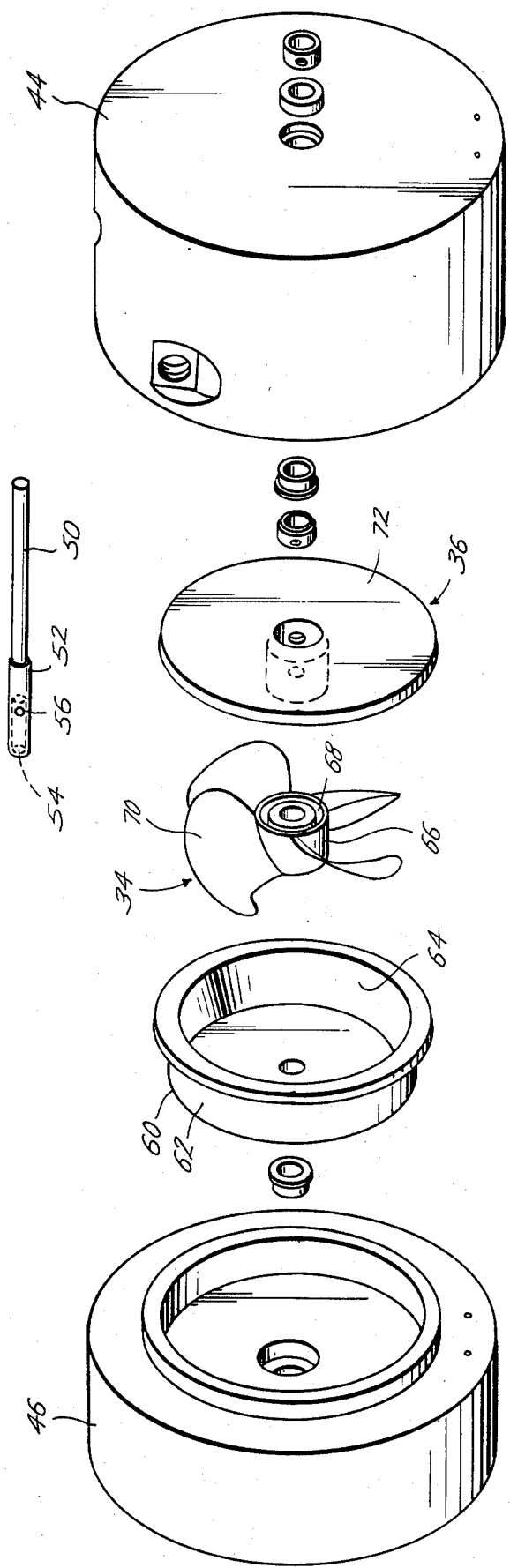
FIG. 5 is a perspective, exploded view of the separation device of the present invention with the shaft hereof offset for clarity.

Elongated shaft 50 is operatively coupled to the motor 16 as shown in FIG. 1, and extends coaxially through the chamber 48 as shown in FIG. 2. As shown in FIGS. 2, 5, the shaft 50 has one end coupled to an extension linkage leading to the motor 16, with the other end presenting an enlarged shoulder 52. Appropriate bushings rotatably support the shaft 50 in the housing. An elongated coaxial passage 54 extends into the shoulder 52 of the shaft 50 and a pair of radially oriented openings 56 extend through the shoulder 52 into communication with the passage 54.

A dish type structure 60 is secured to the shaft 50 about the shoulder 52 (as by the set screw shown in FIG. 2). The dish 60 presents an annular sidewall 62 having an obliquely oriented inner surface 64 which diverges radially outwardly.

The propeller mechanism 34 is similarly coupled to the shaft 50 in the region of the shoulder 52 as shown in FIG. 2. The propeller 34 includes a central hub 66 which is secured to the shaft 50; the hub 66 includes an annular space about the shaft openings 56 and an oppositely oriented annular groove 68 (see FIG. 5). As perhaps best shown in FIG. 3, the propeller 34 includes a plurality of blades 70.

The disc mechanism 36 presents a substantially flat outwardly extending platten 72 and a centrally located upstanding annular boss 74. The boss 74 presents a bore 76 coaxially extending therethrough and four radially-oriented ports 78 extending through the boss adjacent the platten 72 as shown in FIGS. 2, 3. The disc mechanism 36 is coupled to the propeller mechanism 34 for rotation therewith by the reception of the annular boss 74 in the annular groove 68.

The fluid introduction mechanism 32 presents an elongated passage 80 extending radially through the half 44 from the exterior surface of the housing 30 to a point adjacent the opening 49 surrounding the shaft 50 as shown in FIG. 2. A conventional fitting is threadingly coupled in the exterior end of the passage 80 with a suction tube leading to the fluid source. As shown in FIG. 2, the fluid introduction mechanism 32 provides a fluid flow path through the passage 80 into the bore 76 and into the chamber 48 through the ports 78.

The outlet mechanism 38 includes a pair of outwardly extending bores 82 extending outwardly from the chamber 48 through the housing 30. As shown in FIG. 3, the bores 82 are preferably tangentially oriented to the circular cross-section of the chamber 48 to facilitate liquid reception to the bores 82. Each bore 82 is preferably interfitted with a one-way check valve 84 which permits liquid flow out of the chamber 48 while preventing reverse backward flow thereto. As can be appreciated viewing FIG. 2, the coupling of the halves 44, 46, in combination with the platten 72 and dish 60, presents an annular outermost rim region 85 in the chamber 48 adjacent the bores 82.

The collection means 20 preferably consists of a soft, collapsible collection bag 88 operatively connected to each of the outlet bores 82. Tubing is connected to each check valve 84 and leads from the device 18 to a respective bag 88. As shown in FIG. 1, a valve 86 is preferably fitted to the tubing to selectively prevent liquid flow through the tubing toward the respective bag 88 in order to faciliate change of collection bags.

Figure 7:
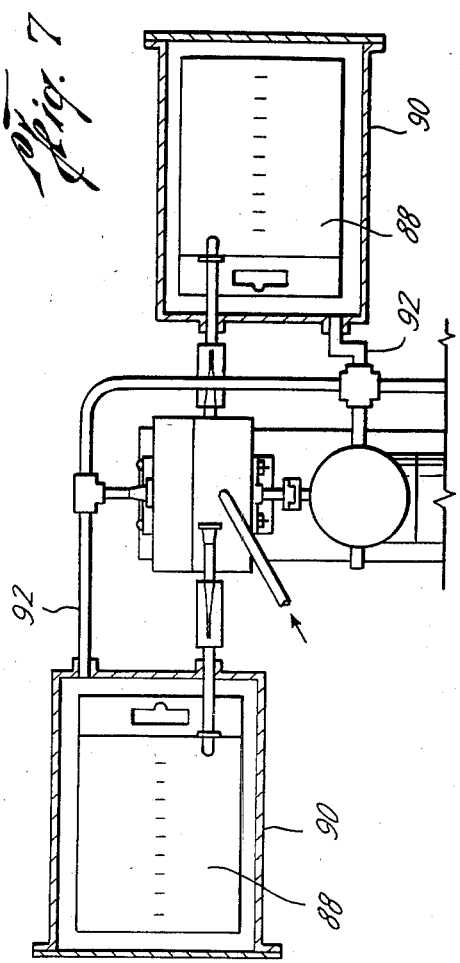
FIG. 7 is a fragmentary, top plan view, similar to FIG. 1, of an alternative embodiment of the section separator unit of the present invention.
Figure 6:
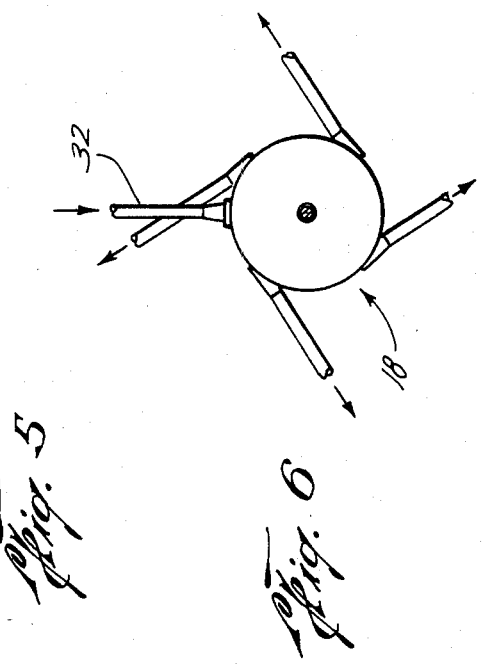
FIG. 6 is a fragmentary, elevational view of one end of an alternative embodiment of the device of the present invention.

Turning to FIG. 7 an alternative embodiment of the collection means 20 is illustrated. In FIG. 7, each collection bag 88 is received in a sealable container 90. Each sealable container 90 is in operable in communication with the suction means 12 via the tubular connections 92. Turning to FIG. 6, a still further embodiment is illustrated wherein the outlet mechanism 38 includes four bores 82 and, correspondingly, four separate collection bags (not shown).

In use, the unit 10 of the present invention separates a fluid mixture into a gaseous component and a liquid component, it being understood that the liquid component may include suspended solid particulates as well. While the suction separation unit 10 was developed to permit space-based surgical operations in a zero-g or microgravity environment, the unit 10 has many other applications as well. For example, the unit 10 may be used to separate other fluids, such as urine, in microgravity environments. Further, the unit 10 is compact when compared with conventional suction devices and, therefore, is particularly well suited for use where space is limited, such as a doctor's office, or helicopter. Further, the unit 10 is fast-reacting in transitioning from gas suction to liquid suction. Finally, capacity is not a limiting factor in the operation of the unit 10. Therefore, the suction separator unit 10 of the present invention is an improvement over conventional suction units in almost all applications.

During operation, the motor 16 is electrically driven and the pumps 14 present a suction source through the suction line 22, assuming the pressure modulation device 24 is open. As can be seen from FIG. 2, the suction is introduced into the chamber 48 through the exhaust structure 40, which includes the line 22, opening 47, passage 54, and the opening 56. The negative pressure induced in the chamber 48 in turn introduces a negative pressure through the fluid introduction mechanism 32.

When the tip of the suction tubing of the fluid introduction mechanism 32 is exposed to a gas such as air, the air is simply pumped through the fluid introduction mechanism 32 into the chamber 48 and expelled through the exhaust structure 40 to the pumps 14. When the fluid introduction mechanism is exposed to a fluid having a liquid component, the negative pressure causes the fluid to be conveyed to the fluid introduction mechanism 32. In surgical operations such fluid would be a biological fluid, such as blood, entrained in air to present a liquid-gas mixture.

The introduction of the biological fluid into the chamber 48 is such that the fluid is directed through the ports 78 so as to impinge upon the blades 70. As can be seen from the drawings, the blades 70 are angled such that a centrifugal force is introduced onto the biological fluid, tending to outwardly radially bias the liquid component of the biological fluid while the gaseous component remains close to the hub 66. A portion of the biological fluid is directed radially outward and towards the platten 72 of the disc mechanism 36. Dependent upon many variables, such as amount of negative pressure, biological fluid quantity, and shaft rpm, some of the liquid component may contact the inner surface 64 of the dish 60. As can be seen from FIG. 2, the angle of the inner surface 64 produces a centrifugal force which biases the liquid component thereon towards the rim region 85. However, in typical applications, the majority of the biological fluid is directed onto the platten 72 of the disc mechanism 36. The centrifugal force imparted to the biological fluid by the spinning disc radially outwardly biases the greater mass density liquid component of the fluid, while the gaseous component of the fluid tends to remain in the central region of the chamber 48 adjacent the shaft 50.

With the liquid component being radially outwardly biased in the chamber 48, the rim region 85 of the chamber 48 tends to collect the liquid component and directs the liquid into the bores 82. The centrifugal pressure on the liquid tends to force the liquid through the check valves 84 and, if the valves 86 are open, into the respective bags 88.

Concurrently with the liquid separation, the negative pressure through the exhaust structure 40 collects the gaseous component of the fluid from the central region of the chamber 48. Thus, the gas is sucked through the openings 56, through the passage 54, and into the suction line 22. If desired, the pressure modulation device 24 can be closed to stop the introduction of negative pressure into the chamber 48. In this event, if the shaft 50 is still rotating, centrifugal separation of the biological fluid continues while no more biological fluid is introduced into the chamber 48. This can, of course, be useful to prevent introducing too much biological fluid into the chamber 48.

Turning to the embodiment of FIG. 7, the collection means 20 simply presents an evacuated condition in the respective sealable container 90. Thus, there is no pressure inhibition which might retard filling of the respective collapsible bags 88.

As one skilled in the art will appreciate, the relatively small dimension of the chamber 48 (approximately 80 cubic centimeters) enables a fast reaction time when transitioning from suctioning to uptake of liquid biological fluids. In contrast to large drop chamber type suction devices, the response time is almost immediate to the operator in conveying the biological fluid.

Although the respective collapsible bags 88 are typically quite large (approximately 3 liters), in the event that the bags reach their capacity, the bags 88 are easily removed without stopping operation of the suction separation unit 10. Thus, the valve 86 is simply closed and the attached bag 88 removed and replaced, while the other bag 88 is still accepting liquid component of the biological fluid. Turning to FIG. 6, in large capacity type operations, several bags 88 can be connected to the device 18 such that the temporary loss of one bag will not effect the fluid handling capacity of the device.

It will be understood that many different structural variations of the suction separation unit 10 are possible without departing from the spirit and scope of the present invention.

Having thus described the invention, what is claimed as new and desired to be secured by Letters Patent is:

1. A device adapted for separating a fluid into gas and liquid components comprising:
   a housing;
   a chamber within the housing, the chamber having an axis and an outer periphery;
   means for introducing the fluid into the chamber;
   propeller means rotatably mounted in the chamber, the propeller means being operable for receiving fluid from the introduction means and for directing a portion of said fluid;
   disc means rotatably mounted in the chamber, the disc means being operable for receiving fluid from the propeller means and for biasing liquid component of the fluid radially outward;
   outlet means in communication with the chamber and disposed along the outer periphery of the chamber remote from the axis, said outlet means being operable for passing liquid component out of the chamber; and
   exhaust means in communication with the chamber and located adjacent the axis of the chamber, said exhaust means being operable for allowing passage of gaseous component out of the chamber.

2. A device in accordance with claim 1, wherein the chamber is cylindrically shaped.

3. A device in accordance with claim 1, wherein the propeller means is mounted for rotation about an axis parallel with the chamber axis and the disc means is mounted for rotation about an axis parallel with the chamber axis.

4. A device in accordance with claim 1, wherein the chamber, propeller means and disc means are generally coaxial.

5. A device in accordance with claim 1, including an elongated shaft disposed along the axis of the chamber, the propeller means and disc means each being mounted for rotation about said axis.

6. A device in accordance with claim 5, said introduction means including
   an elongated passage extending from the exterior of the housing to an annular cavity about the shaft;
   a boss having one end coupled to the disc means and the other end coupled for rotation with the shaft;
   structure defining a bore through the boss, the bore being in operable communication with said cavity; and
   structure defining a radially-oriented port in the boss, the port being in communication with the bore, wherein a fluid flow path is defined through the passage, cavity, bore and port into the chamber.

7. A device in accordance with claim 5, said propeller means being mounted on the shaft for rotation therewith and including a plurality of radially-outwardly extending, obliquely-angled blades.

8. A device in accordance with claim 7, said fluid introducing means including radially-oriented outlet ports adjacent the shaft proximate to the propeller means for passing the fluid into the chamber, the blades being operable for contacting the introduced fluid.

9. A device in accordance with claim 8, wherein the blades are angled for directing at least part of the fluid onto the surface of the disc means.

10. A device in accordance with claim 1, wherein the outlet means includes a one-way check valve operable for passing liquid component of the portion out of the chamber.

11. A suction separator unit comprising:
    a housing including a chamber having an axis and an outer periphery;
    suction means for producing a negative pressure in the chamber, including a passageway adjacent the axis of the chamber;
    means for introducing a fluid comprising liquid and gaseous components into the chamber;
    propeller means rotatably mounted in the chamber and having a plurality of blades,
    the introducing means having structure for passing the fluid into the chamber to impinge upon the blades,
    the blades bring operable for directing a portion of the impinging fluid radially outwardly and in a certain axial direction;
    disc means rotatably mounted in the chamber and positioned for receiving directed fluid from the propeller means, the disc means being operable for biasing the greater mass density liquid component of the fluid radially outward,
    the suction means being operable for conveying the lesser mass density gaseous component of the fluid outward through the passageway; and
    outlet means located adjacent the outer periphery of the chamber for passing the radially-biased liquid component out of the chamber.

12. The separator unit in accordance with claim 11, wherein the disc means is mounted in said certain axial direction relative to the propeller means.

13. The separator unit in accordance with claim 11, including an elongated shaft disposed along the axis of the chamber, the propeller means and disc means being coupled to the shaft for rotation therewith.

14. The separator unit in accordance with claim 12, wherein the introducing means includes structure defining a passage having one end adaptable for communication with a fluid and the other end in communication with the chamber, said negative pressure in the chamber operable for conveying fluid through the passage into the chamber.

15. The separator unit in accordance with claim 13, including a rotatable dish having an annular sidewall, the dish being mounted on said shaft with the sidewall in circumscribing relation to the propeller means.

16. The separator unit in accordance with claim 15, said disc means being mounted on one side of the propeller means, the dish being mounted on the other side of the propeller means and the dish sidewall having an obliquely angled inner surface.

17. The separator unit in accordance with claim 16, said dish being coupled to the shaft for rotation therewith and the inner surface angled such that rotation of the dish biases fluid on the sidewall in a direction away from the dish.

18. The separator unit in accordance with claim 11, said outlet means including a plurality of outwardly-extending bores through the housing.

19. The separator unit in accordance with claim 18, including one-way check valves disposed in the bores for passing liquid component out of the chamber while preventing fluid flow back into the chamber.

20. The separator unit in accordance with claim 18, said chamber being circular in cross-section and said bores being tangentially oriented relative to the chamber.

21. The separator unit in accordance with claim 11, including collection means operably coupled to the outlet means for receiving liquid component from the outlet means.

22. The separator unit in accordance with claim 21, including a shut-off valve interposed between the outlet valve and the collection means.

23. The separator unit in accordance with claim 21, said collection means including a collapsible bag for receiving the liquid component.

24. The separator unit in accordance with claim 23, including a sealed container holding the collapsible bag, the container being operably coupled to the suction means for producing a negative pressure in the container.

25. The separator unit in accordance with claim 13, the suction means including an axial passage in the shaft with one or more radial openings in the shaft in communication with the chamber.

26. The separator unit in accordance with claim 25, the suction means including a pump in operable communication with the axial passage in the shaft.

27. A method for transporting biological fluid or the like and for separating the biological fluid into gas and liquid components, comprising the steps of:
   providing a chamber having an outer periphery and a central region;
   introducing a source of negative pressure into the chamber;
   providing a fluid inlet passage into the chamber and placing the inlet passage in communication with a source of biological fluid;
   suctioning the biological fluid through the passage into the chamber;
   directing the biological fluid onto a rotatable propeller mounted in the chamber;
   redirecting a portion of the biological fluid from the propeller onto a rotatable, disc mounted in the chamber;
   biasing a liquid component of the fluid portion radially outward towards said outer periphery by spinning the disc;
   collecting the liquid component at a location adjacent said outer periphery; and
   gathering a gas component at a location adjacent said central region.

28. The method according to claim 27, the chamber being generally cylindrical and having an axis, the source of negative pressure being introduced into the chamber adjacent the axis, the gas component being gathered through the source of negative pressure.

29. The method according to claim 27, including the steps of:
   providing an elongated, rotatable shaft extending through the chamber;
   mounting the disc and propeller on the shaft; and
   rotating the shaft while directing the biological fluid onto the propeller, the propeller operable for redirecting a portion of the biological fluid onto the disc.

30. The method according to claim 27 including the steps of:
   providing a collapsible bag operable for receiving the liquid components;
   placing the bag in a sealable container; and
   communicating a source of negative pressure with the container.

31. The method according to claim 27, including the steps of:
   providing a plurality of liquid collection containers for receiving the liquid component at a plurality of locations;
   stopping flow of the liquid component at one of the locations while a container is replaced; and
   starting flow of the liquid component at said one location after replacement of the container.

* * * * *